United States Patent
Odakura (10) Patent No.: US 8,117,318 B2
(45) Date of Patent: Feb. 14, 2012

(54) ELECTRONIC APPARATUS AND COMMUNICATION CONTROL METHOD

(75) Inventor: Satoshi Odakura, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 83 days.

(21) Appl. No.: 12/608,952

(22) Filed: Oct. 29, 2009

(65) Prior Publication Data

US 2010/0262701 A1  Oct. 14, 2010

(30) Foreign Application Priority Data

Apr. 10, 2009  (JP) ................... 2009-096110

(51) Int. Cl.
  *G06F 15/16* (2006.01)
(52) U.S. Cl. ..................................... 709/227
(58) Field of Classification Search .................. 709/227
  See application file for complete search history.

(56) References Cited

U.S. PATENT DOCUMENTS

| 2003/0027566 | A1* | 2/2003 | Weiner .................... | 455/426 |
| 2008/0310394 | A1* | 12/2008 | Hansen et al. ............... | 370/350 |
| 2009/0006695 | A1* | 1/2009 | Bushell et al. .............. | 710/262 |

FOREIGN PATENT DOCUMENTS

| JP | 04-230556 A | 8/1992 |
| JP | 2505063 B2 | 4/1996 |
| JP | 2003-258857 A | 9/2003 |
| JP | 2003-303170 A | 10/2003 |
| JP | 2004-102443 | 4/2004 |
| JP | 2004-519935 A | 7/2004 |
| JP | 2007-259059 | 10/2007 |

* cited by examiner

*Primary Examiner* — Jerry Dennison
(74) *Attorney, Agent, or Firm* — Patterson & Sheridan, LLP (57) ABSTRACT

According to one embodiment, a session control module is configured to temporarily release a first session between a first communication program and the external device by stopping a first conversion module corresponding to a an application protocol of the first communication without informing the first communication program of releasing of the first session, and to establish a second session between a second communication program and the external device by activating a second conversion module corresponding to an application protocol of the second communication program. A session restoring module is configured to restore the first session to a data transferable state by activating the first conversion when the second session is finished.

6 Claims, 8 Drawing Sheets

ELECTRONIC APPARATUS AND COMMUNICATION CONTROL METHOD

CROSS-REFERENCE TO RELATED APPLICATIONS

This application is based upon and claims the benefit of priority from Japanese Patent Application No. 2009-096110, filed Apr. 10, 2009, the entire contents of which are incorporated herein by reference.

BACKGROUND

1. Field

One embodiment of the invention relates to an electronic apparatus which executes close proximity wireless transfer, and a communication control method which is applied to the electronic apparatus.

2. Description of the Related Art

In recent years, in IC cards, mobile phones, etc., wireless communication such as Near Field Communication (NFC) has begun to be used. A user can easily execute communication for an authentication process, an accounting process, etc., simply by performing an operation of holding the IC card or mobile phone over a reader/writer module of a host apparatus.

Recently, a new close proximity wireless transfer technique, which enables communication at higher speed, has begun to be developed. The new close proximity wireless transfer technique makes it possible to exchange data files such as document data, image data, and audio data between devices as well as authentication and charging services, simply by bringing the devices close to each other.

Japanese Patent No. 2505063 discloses a system which establishes a virtual chain within a distributed computer network. In this system, when communication is executed between two servers, a virtual chain is established by using control block resources of respective intermediate nodes between these servers. By the establishment of the virtual chain, the amount of information, which is needed in each intermediate node, can be reduced.

However, the system of Japanese Patent No. 2505063 relates to a distributed computer network, and no consideration is given to close proximity wireless transfer, by which data transfer is executed between two devices which are set in a close proximity state.

In a close proximity wireless transfer system, communication between two devices which are set in a close proximity state is executed in a peer-to peer mode. A session is established between an application (communication program) of one device and an application (communication program) of the other device, and communication between the applications is executed through the session.

However, in usual cases, in the close proximity communication system, the number of sessions which can be used at the same time is limited to one. Thus, in order to execute, while an application (A) is executing communication, communication by using another application (B), it is necessary to temporarily release the session which is currently in communication. In this case, the user is required to perform, for example, an operation of temporarily finishing the application (A). In addition, in the case of resuming communication with use of the application (A), it is necessary to establish the session once again, which is used by the application (A). In this case, the user is required to perform, for example, an operation of finishing the application (B) and starting the application (A).

Thus, in the close proximity wireless communication system, many user operations are needed to switch the application which is used for communication.

It is necessary, therefore, to realize a novel technique for easily switching an application which executes communication with an external device by using close proximity wireless transfer.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus comprises a communication module, a communication adapter module, a session establishing module, a session control module, and a session restoring module.

The communication module is configured to establish a connection between the communication module and an external device which are in close proximity state, and execute close proximity wireless transfer with the external device. The communication adapter module comprises a plurality of conversion modules which are configured to convert a plurality of kinds of data, which correspond to a plurality of application protocols, to a predetermined transmission data format. The session establishing module is configured to establish a first session between a first communication program of an application layer and the external device by activating a first conversion module of the plurality of conversion modules, which corresponds to an application protocol of the first communication program of the application layer, in response to a session start request which is transmitted from the first communication program of the application layer. The session control module is configured to execute, when a session start request is received from a second communication program of the application layer in a state in which the first session is established, a process of temporarily releasing the first session by stopping the first conversion module without informing the first communication program of releasing of the first session, a process of storing session information indicative of the first conversion module, and a process of establishing a second session between the second communication program and the external device by activating a second conversion module of the plurality of conversion modules, which corresponds to an application protocol of the second communication program. The session restoring module is configured to restore the first session to a data transferable state by activating the first conversion module based on the stored session information when the second session is finished.

Figure 1:
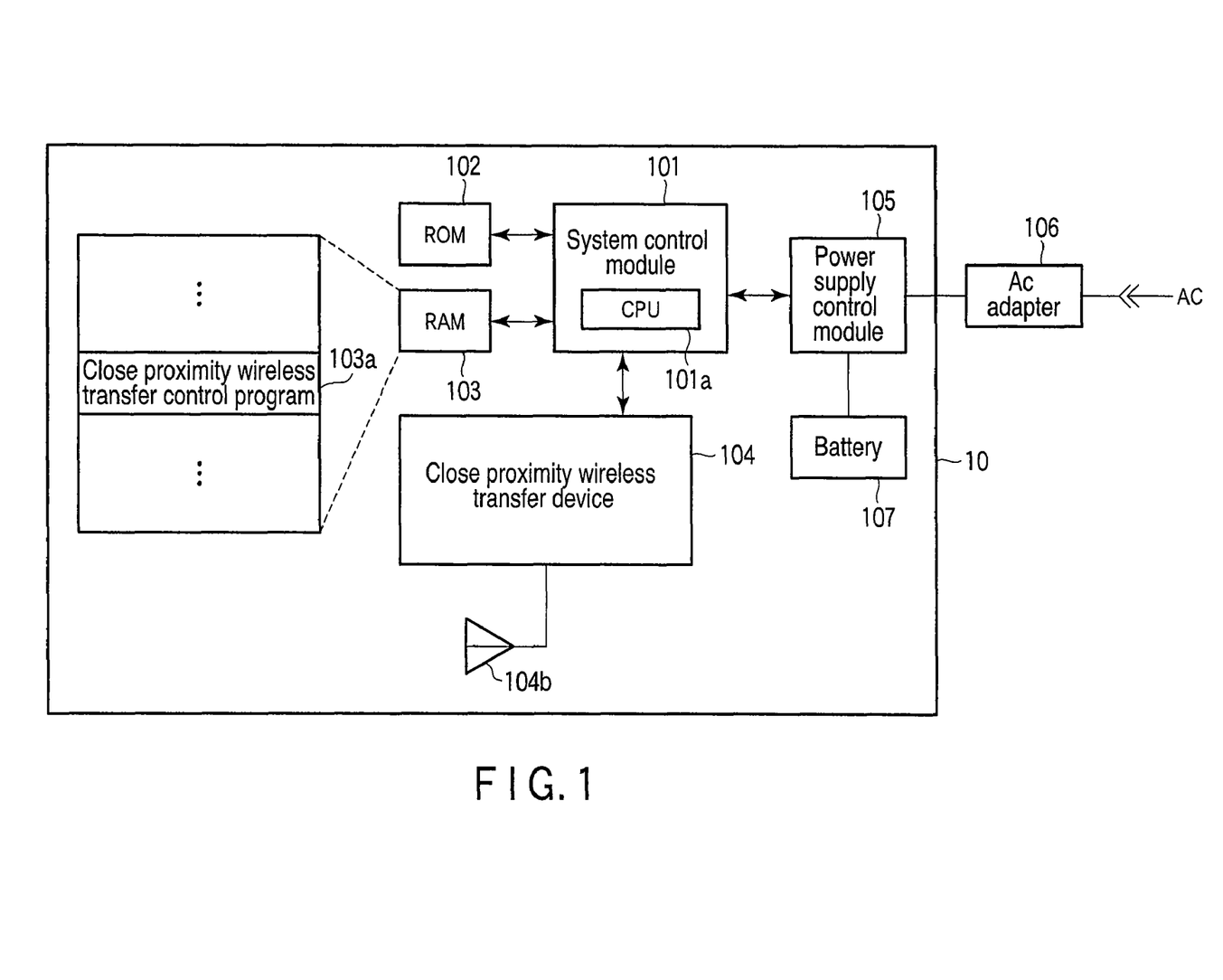
FIG. 1 is an exemplary block diagram showing the system configuration of an electronic apparatus according to an embodiment of the invention.

FIG. 1 shows the structure of an electronic apparatus according to an embodiment of the invention. The electronic apparatus 10 is realized, for example, as a portable apparatus (e.g., a mobile phone, a PDA, or an audio player), a personal computer, or a consumer apparatus (e.g., a TV or a video recorder). The electronic apparatus 10 includes a system control module 101, a ROM 102, a RAM 103, a close proximity wireless transfer device 104, a power supply control module 105, an AC adapter 106 and a battery 107.

The system control module 101 controls the operations of the respective components in the electronic apparatus 10. The system control module 101 includes a CPU 101a, and is connected to the ROM 102, RAM 103, close proximity wireless transfer device 104, and power supply control module 105.

The CPU 101a is a processor which loads instructions and data, which are stored in the ROM 102, into the RAM 103, and executes necessary processes. In the RAM 103, a close proximity wireless transfer control program 103a for controlling close proximity wireless transfer is loaded. The CPU 101a executes the close proximity wireless transfer control program 103a which is loaded in the RAM 103, thereby controlling the close proximity wireless transfer device 104.

The close proximity wireless transfer device 104 is a communication module which executes close proximity wireless transfer. The close proximity wireless transfer device 104 establishes wireless connection to some other device (external device) having a close proximity wireless transfer function, which is present within a predetermined distance from the close proximity wireless transfer device 104, and starts transmission of data such as files. The close proximity wireless transfer between the close proximity wireless transfer device 104 and the external device is executed in a peer-to-peer mode. The range of communication is, e.g., 3 cm. It is possible to establish a wireless connection between the close proximity wireless transfer device 104 and the external device only when the distance between them falls within the range of communication (e.g., 3 cm). When the close proximity wireless transfer device 104 and the external device are brought close to each other within the range of communication, the wireless connection between the close proximity wireless transfer device 104 and the external device is established. Then, transmission of data, such as a data file which is explicitly designated by the user, or a predetermined data file which is to be synchronized, is executed between the close proximity wireless transfer device 104 and the external device.

In the close proximity wireless transfer, an induction electric field is used. As a close proximity wireless transfer method, TransferJet, for instance, can be used. TransferJet is a close proximity wireless transfer method which uses UWB, and high-speed data transfer can be realized.

The close proximity wireless transfer device 104 is connected to an antenna 104b. The antenna 104b is an electrode called "coupler", and executes data transmission/reception to/from the external device by a wireless signal using an induction electric field. When the external device comes near within the range of the communication (e.g. 3 cm) from the antenna 104b, the antennas (couplers) of the close proximity wireless transfer device 104 and the external device are coupled by the induction electric field, and thereby wireless communication between the close proximity wireless transfer device 104 and the external device is enabled. In the meantime, the close proximity wireless transfer device 104 and the antenna 104b can be realized as a single module.

The power supply control module 105 supplies power to the respective components in the electronic apparatus 10 by using power which is supplied from the outside via the AC adapter 106 or power which is supplied from the battery 107. In other words, the electronic apparatus 10 is driven by an external power supply such as an AC commercial power supply, or by the battery 107. The AC adapter 106 may be provided within the electronic apparatus 106.

Figure 2:
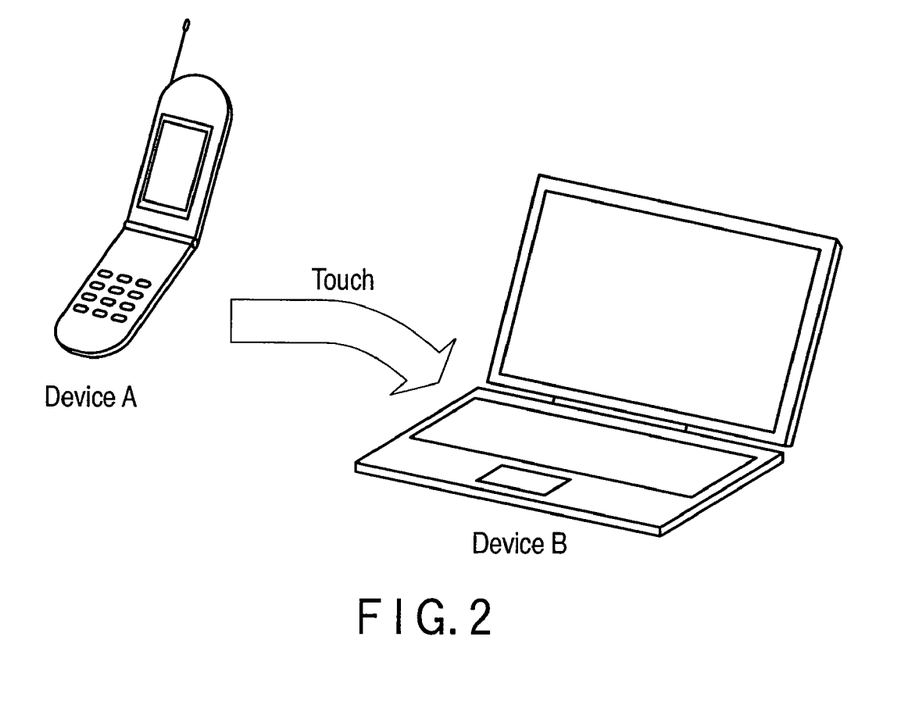
FIG. 2 shows an example of close proximity wireless transfer which is executed between the electronic apparatus of the embodiment and an external device.

FIG. 2 illustrates close proximity wireless transfer which is executed between two devices.

In this case, it is assumed that a device A is composed of a mobile phone, and a device B is composed of a portable computer. A user performs an operation (also referred to as "touch operation") of bringing, for example, the device A close to the device B. Thereby, data transfer between the devices A and B can be executed. The execution of the data transfer between the devices A and B is triggered when the devices A and B have been brought close to each other.

In the meantime, in the close proximity wireless transfer technique such as TransferJet, the number of sessions, which can be used at the same time, is limited to only one. By limiting the number of sessions which can be used at the same time to only one, it becomes possible to restrict the resources necessary for communication, and to simplify the structure that is necessary for session control.

The session (also referred to as "communication session") corresponds to a (virtual) communication path which is used for communication between the application (communication program) of one device A and the application (communication program) of the other device B. In order to establish, during communication of a certain application, a session corresponding to another application, it is necessary to temporarily release the session corresponding to the application which is currently in communication. In addition, when the communication using the application, the session of which was once release, is to be resumed, it is necessary to execute a process for re-establishing the session corresponding to this application.

In the electronic apparatus 10 of the present application, in order to easily switch the application for executing the communication with the external device by using close proximity wireless transfer, there is provided a pseudo-session management function which maintains a plurality of sessions at the same time in a pseudo-manner. By this pseudo-session management function, for example, during the communication process by an application (communication program) for executing data transfer between devices A and B with use of a certain protocol, it is possible to execute, while the session corresponding to this application (communication program) is being maintained in a pseudo-manner, the communication by another application (another communication program) for executing data transfer between the devices A and B with use of another protocol.

Figure 3:
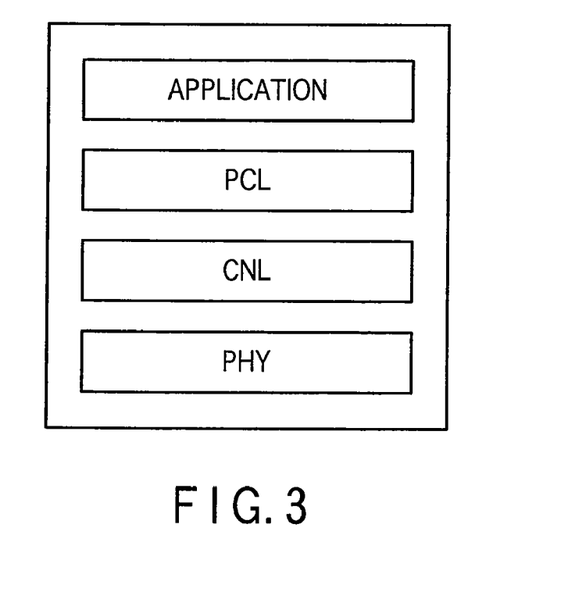
FIG. 3 shows an example of software architecture for controlling close proximity wireless transfer, which is applied to the electronic apparatus of the embodiment.

Next, referring to FIG. 3, a description is given of a software architecture for controlling close proximity wireless transfer which is executed with use of the close proximity wireless transfer device 104.

The software architecture of FIG. 3 shows a hierarchical structure of a protocol stack for controlling close proximity wireless transfer. The protocol stack comprises a physical layer (PHY), a connection layer (CNL), a protocol conversion layer (PCL), and an application layer. For example, the connection layer (CNL), the protocol conversion layer (PCL) and the application layer can be realized by the wireless transfer control program 103a.

The physical layer (PHY) is a layer which controls physical data transfer, and corresponds to a physical layer in an OSI reference model. A part or all of the functions of the physical layer (PHY) may also be realized by using hardware in the close proximity wireless transfer device 104.

The physical layer (PHY) converts data from the connection layer (CNL) to wireless signal which is used to communicate between devices A and B. The connection layer (CNL) corresponds to a data link layer and a transport layer in the OSI reference model, controls the physical layer (PHY), and executes data communication. The connection layer (CNL) executes a process of establishing connection (CNL connection) between devices A and B, i.e., connection (CNL connection) between the close proximity wireless transfer device 104 and the external device which are set in a close proximity state, in reply to a connection request from the protocol conversion layer (PCL) or a connection request from the external device.

The protocol conversion layer (PCL) corresponds to a session layer and a presentation layer in the OSI reference model, and is positioned between the application layer and the connection layer (CNL) for controlling establishment and release of connection between the devices A and B. The protocol conversion layer (PCL) executes control of each application (communication program) in the application layer and control of the connection layer (CNL).

To be more specific, the protocol conversion layer (PCL) executes a conversion process for converting data (user data), which corresponds to an application protocol (e.g. SCSI, OBEX, or other general-purpose protocol) which is handled by each communication program in the application layer, to a specific transmission data format. By this conversion process, data, which is transmitted/received by any kind of communication program, can be converted to a packet (data of a specific transmission data format) which can be handled by the connection layer (CNL). This protocol conversion layer (PCL) makes it possible to use various application protocols (e.g. SCSI, OBEX, other general-purpose protocol) in the close proximity wireless transfer.

Furthermore, the protocol conversion layer (PCL) executes a process of exchanging service information (information indicative of services which can be provided by respective devices) and session information (information relating to a session that is to be established/released) with a communication-counterpart device, and also executes start-up of an application, management of connection, and management of sessions. The user application layer includes a plurality of communication programs (applications) corresponding to some application protocols such as SCSI, OBEX and other general-purpose protocols. Each application executes a process of issuing a request for starting/ending a session to the protocol conversion layer (PCL), and a process of transmitting/receiving data via the protocol conversion layer (PCL).

The above-described pseudo-session management function can be implemented, for example, in the protocol conversion layer (PCL).

Figure 4:
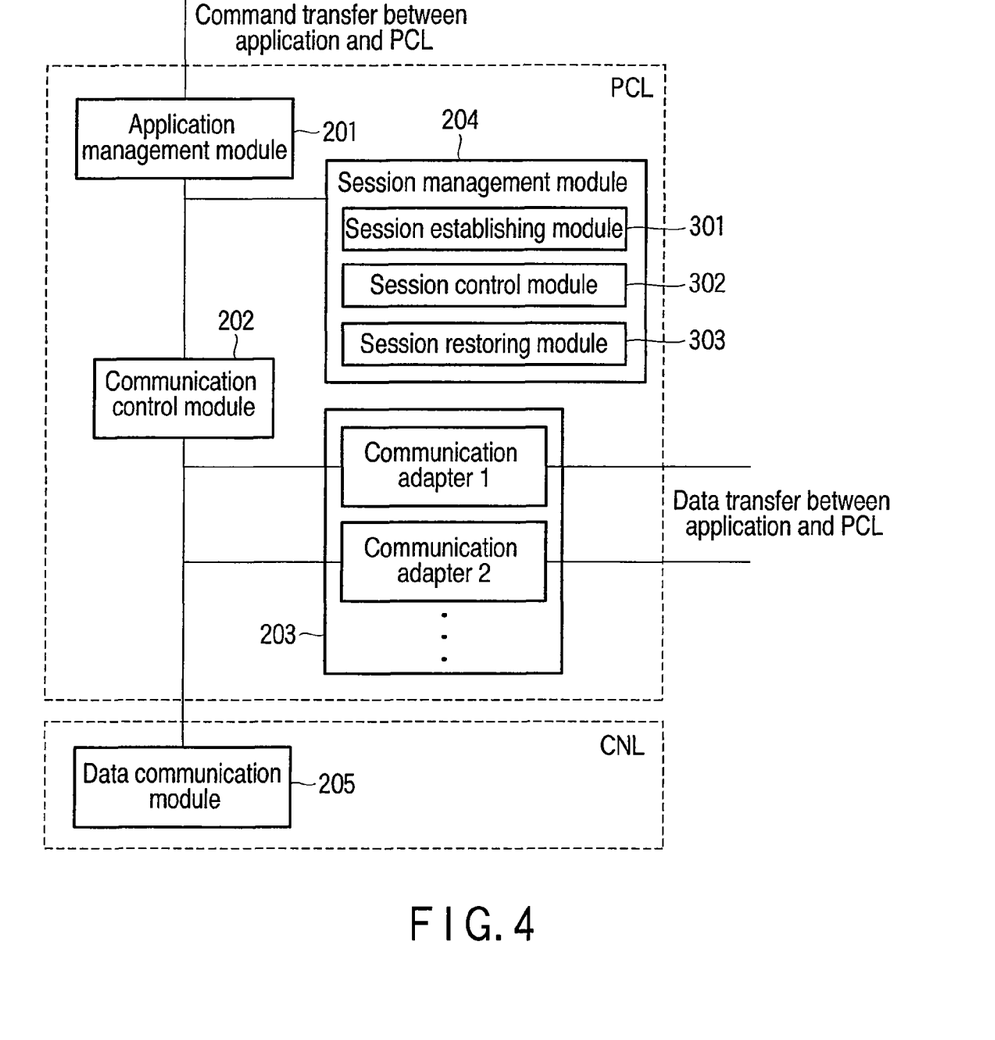
FIG. 4 is an exemplary block diagram showing a structure example of a PCL which is included in the software architecture of FIG. 3.

Next, referring to FIG. 4, the functional structure of the protocol conversion layer (PCL) is described.

As is shown in FIG. 4, the protocol conversion layer (PCL) includes an application management module 201, a communication control module 202, a communication adapter 203, and a session management module 204.

The application management module 201 manages a plurality of applications (communication programs) for executing data transmission/reception by using close proximity wireless transfer. The application management module 201 executes a process of informing the session management module 204 of a request for starting/ending a session from an application, and a process of controlling the communication control module 202.

The communication control module 202 cooperates with the session management module 204 and controls the start and end of communication (session) and the activation and stop of the communication adapter, in accordance with a request from the application management module 201 or a request from the session management module 204. The communication adapter 203, as described above, executes a conversion process for converting data, which corresponds to a protocol that is handled by the application, to a predetermined transmission data format. The communication adapter 203 includes a plurality of conversion modules (communication adapter modules) which convert plural kinds of data, which correspond to plural application protocols, to the specific transmission data format. Specifically, the communication adapter 203 includes: (i) a communication adapter module which converts data, which is transmitted/received by an application corresponding to SCSI, to the transmission data format which can be handled by the data communication module 205 of the connection layer, (ii) a communication adapter module which converts data, which is transmitted/received by an application corresponding to OBEX, to the transmission data format which can be handled by the data communication module 205 of the connection layer, and (iii) a communication adapter module which converts data, which is transmitted/received by an application corresponding to some other general-purpose protocol, to the transmission data format which can be handled by the data communication module 205 of the connection layer.

The number of types of communication adapter modules, which can be activated at the same time, is only one. When a session, by which a certain application executes communication with an external device, is to be established, the session management module 204 activates the communication adapter module corresponding to the type of data that is transmitted/received by this application (i.e. the communication adapter module corresponding to the application protocol of this application). Thereby, it becomes possible to establish a session which is suited to the data type that is handled by the application for use in communication.

The session management module 204 receives, via the application management module 201, a session start request and a session end request from the application. The session management module 204 executes a process of establishing a session or a process of releasing (cutting off) the session, in accordance with the received session start request/session end request.

Further, the session management module 204 has a pseudo-session management function. The session management module 204 can establish, while maintaining in a pseudo-manner a session corresponding to a data type (protocol) of an application which is currently in communication, a new session corresponding to a data type (protocol) of another application. When the session which is currently in communication ends, the session management module 204 can automatically restore the session, which is maintained in the pseudo-manner, to a state (data transferable state) in which data transfer can be executed.

The session management module 204 includes a session establishing module 301, a session control module 302 and a session restoring module 303.

For example, an application (communication program A), which has been instructed by a user operation to execute communication, such as transfer of a certain data file, issues a session start request (communication start request). Upon receiving the session start request from the communication program A, the session establishing module 301 of the session management module 204 activates the communication adapter module (communication adapter module A) corresponding to the application protocol of the communication program A, thereby establishing a session A between the communication program A and the external device. The session A is used in order to transmit or received the data corresponding to the application protocol of the communication program A between the communication program A of the electronic apparatus 10 and the communication program of the external device via the close proximity wireless transfer device 104. Session information, which includes information indicative of the communication adapter module A that is used in the session A and information indicative of the kind of data that is transmitted via the session A, is reported to the external device by the session management module 204. In the external device, the communication adapter module A is activated on the basis of the session information from the electronic apparatus 10. In addition, in the external device, a communication program corresponding to the same application protocol as the application protocol of the communication program A is activated.

In the case where a session start request from another communication program B of the application layer has been received in the state in which the session A is established, the session control module 302 of the session management module 204 executes a process of changing the state of the session A to a pseudo-session state. Specifically, the session control module 302 stops the communication adapter module A without informing the communication program A of the release of the session A, thereby temporarily releasing the session A. The state in which the communication adapter module A alone is stopped, without informing the communication program A of the release of the session A, is referred to as the pseudo-session state of the session A. By changing the state of the session A to the pseudo-session state, the communication program A can be made to have such recognition that the session A is maintained, and the resource (communication adapter module), which is used by the communication program A, can be released.

Subsequently, the session control module 302 stores the information, which is indicative of the communication adapter module A that is used in the session A, in a predetermined memory in the electronic apparatus 10 as the session information relating to the session A which has been changed to the pseudo-session state. Then, the session control module 301 cooperates with the session establishing module 301 and establishes the session B between the communication program B and the external device. The session B is used in order to transmit or received the data corresponding to the application protocol of the communication program B between the communication program B of the electronic apparatus 10 and the communication program of the external device via the close proximity wireless transfer device 104.

In the process of establishing the session B, the communication adapter module (communication adapter module B) for converting the data corresponding to the application protocol of the communication program B to the transmission data format is activated, thereby establishing the session B for executing data transmission between the communication program B and the external device. Session information, which includes information indicative of the communication adapter module B and information indicative of the kind of data that is transmitted via the session B, is reported to the external device by the session management module 204. In the external device, the communication adapter module B is activated on the basis of the session information from the electronic apparatus 10. In addition, in the external device, a communication program corresponding to the same application protocol as the application protocol of the communication program B is activated.

In usual cases, in the state in which a certain session is established, a session start request from some other application is rejected by the PCL layer.

However, the PCL layer of the present embodiment determines whether an already established session is present when the session start request has been received. If an already established session is present, the state of this session is changed to a pseudo-session state. Thereby, a new session can be established while the already established session is being maintained in a pseudo-manner.

When the session B is finished, that is, when the data transmission between the communication program B and the external device via the session B is finished, the session restoring module 303 activates the communication adapter module A which was in use by the session A, on the basis of the stored session information. Thereby, the session restoring module 303 automatically restores the session A to the data transferable state (normal session state). Thus, the data transfer between the communication program A and the external device can be resumed.

In the case where transmission data from the communication program A is received while the session A is in the pseudo-session state, the session control module 302 or communication control module 202 can store the received data in a buffer. When the session A is restored to the data transferable state, the session control module 302 or communication control module 202 outputs the data, which is stored in the buffer, to the activated communication adapter module A. The same process is executed in the external device, too. As a result, while the session A is in the pseudo-session state, the communication between the close proximity wireless transfer device 104 and the external device via the session A is set in a standby state, and no data of the application protocol of the session A is transmitted and received between the close proximity wireless transfer device 104 and the external device. Moreover, until the buffer becomes full, there occurs no loss of transmission/reception data which corresponds to the application protocol of the session A. When the session A is restored, the transmission/reception of the data stored in the buffer can be executed.

In the meantime, while the session A is in the pseudo-session state, the communication program A may be made to stand by for the execution itself of data transfer, so that no transmission data may be sent from the communication program A to the PCL device. After the session A is set in the pseudo-session state, the communication control module 202 returns no response to the communication program A even if the communication control module 202 receives a data transmission request or a data reception request from the communication program A. Thereby the communication program A can be made to stand by for the execution of data transfer.

In the case where a session start request from another communication program C is received in the state in which the session B corresponding to the communication program B is established, the session control module 302 executes (1) a process of setting the state of the session B, which is currently established, in a pseudo-session state, (2) a process of storing session information which is indicative of the communication adapter module B which has been used in the session B, and (3) a process of activating a communication adapter module (communication adapter module C) for converting data corresponding to the application protocol of the communication program C to the transmission data format, thereby establishing a session C for executing data transfer between the communication program C and the external device. Thereby, data transfer between the communication program C and the external device is enabled.

As has been described above, the pseudo-session management function of the present embodiment makes it possible to execute the communication of an application, which is operated later by the user, in preference to the communication of an application which has been executed earlier.

When the session C is finished, that is, when the data transfer between the communication program C and the external device via the session C is finished, the session restoring module 303 selects an object of restoration from two sessions (session A and session B) which are set in the pseudo-session state, and restores the selected session to the normal session state in which data transfer can be executed. For example, an immediately preceding session which is set in the pseudo-session state, that is, a session which is last set in the pseudo-session state (the session B in this case), is preferentially selected and restored as a to-be-restored session.

The session management module 204 also executes a process of informing the communication-counterpart external device of the session which is set in the pseudo-session state and the session which is restored to the normal session.

Figure 5:
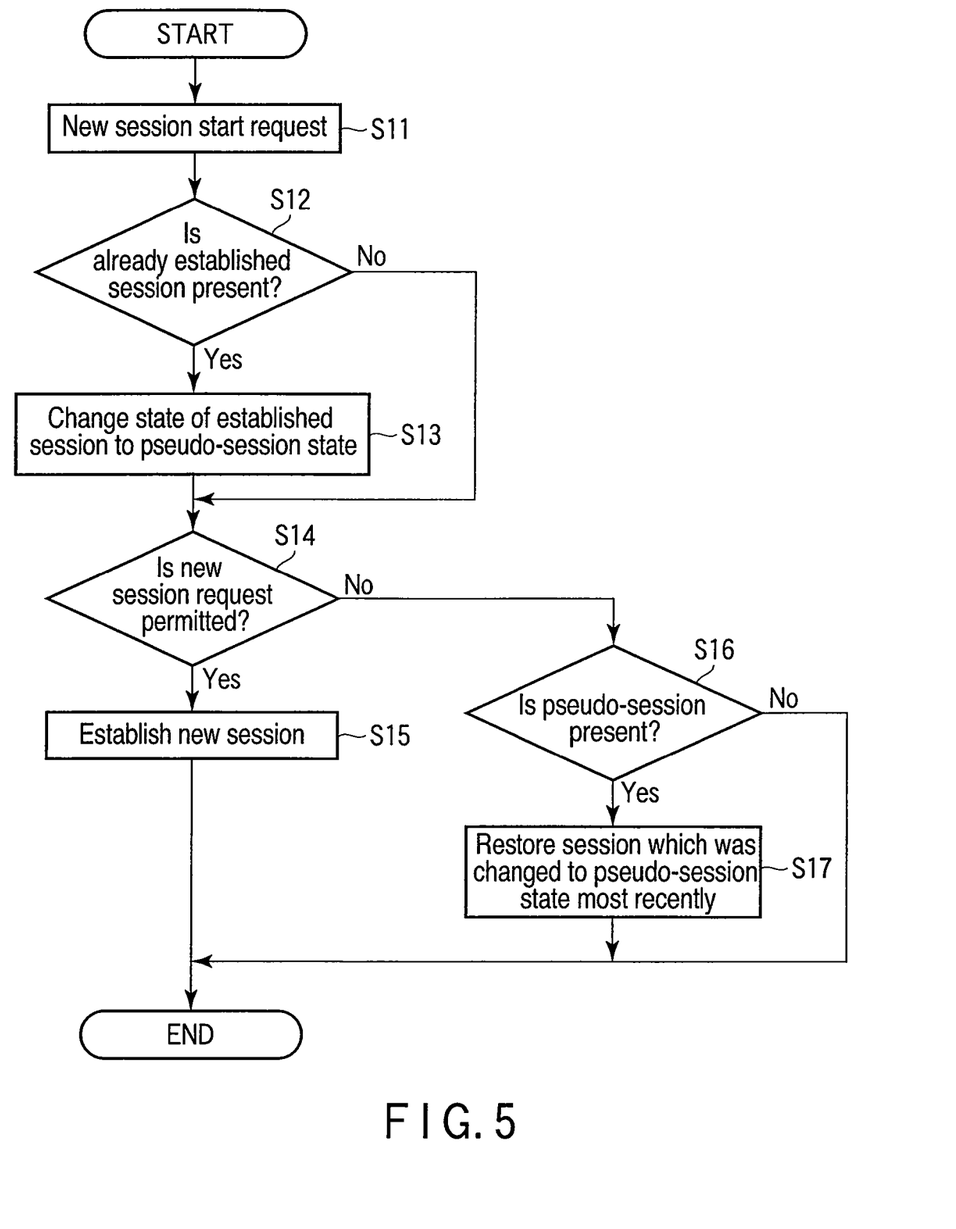
FIG. 5 is an exemplary flow chart illustrating an example of the procedure of a process which is executed at the start of a session by the electronic apparatus of the embodiment.

Next, referring to a flow chart of FIG. 5, an example of the procedure of a session establishing control process which is executed when a new session is established.

When a new session start request from an application has been received via the application management module 201 (step S11), the session management module 204 starts a session establishing control process. In this case, the session management module 204 determines whether there is an already established session or not (step S12). If there is no already established session, the session management module 204 executes a normal new session establishing process (step S14, S15). On the other hand, if there is an already established session, the session management module 204 executes a process of changing the state of this session to the pseudo-session state (step S13), and then executes the normal new session establishing process (step S14, S15).

In the new session establishing process, the session management module 204 executes a negotiation for establishing a new session with a communication-counterpart external device, and determines whether the establishment of a new session is permitted by the communication-counterpart external device (step S14). In the negotiation process, the session management module 204 executes a process of informing the external device of the session information relating to a new session that is to be established (e.g. information indicative of a communication adapter module to be used, and information indicative of a data type of an object of transmission/reception). If the establishment of a new session is not permitted by the communication-counterpart external device, the session management module 204 determines whether there is a session in a pseudo-session state (step S16). If there is a session in a pseudo-session state, the session management module 204 executes a process of restoring the session, which was changed to the pseudo-session state most recently, to the normal session state (original state) (step S17).

Figure 6:
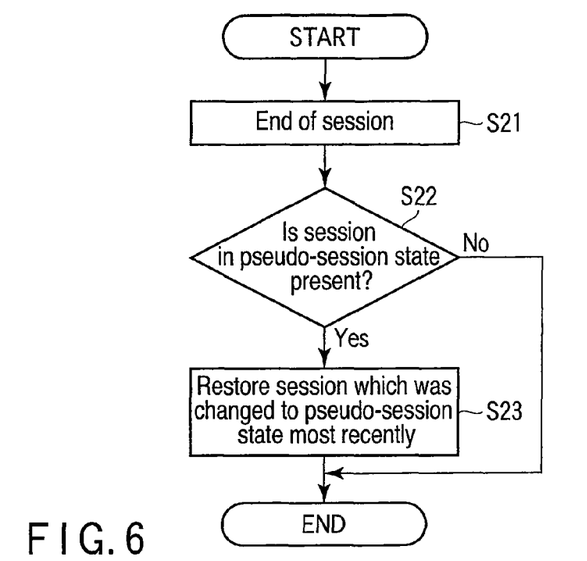
FIG. 6 is an exemplary flow chart illustrating an example of the procedure of a process which is executed at the end of a session by the electronic apparatus of the embodiment.

Next, referring to a flow chart of FIG. 6, a description is given of an example of the procedure of a process which is executed at the end of a session.

When communication using a currently established session is finished, that is, when a session is finished (step S21), the session management module 204 releases (cuts off) the session, and executes a process of restoring a session which is in the pseudo-session state. Specifically, the session management module 204 determines whether there is a session in the pseudo-session state (step S22). If there is a session in the pseudo-session state, the session management module 204 executes a process of restoring the session, which was changed to the pseudo-session state most recently, to the original state in which data transfer can be executed (step S23).

Figure 7:
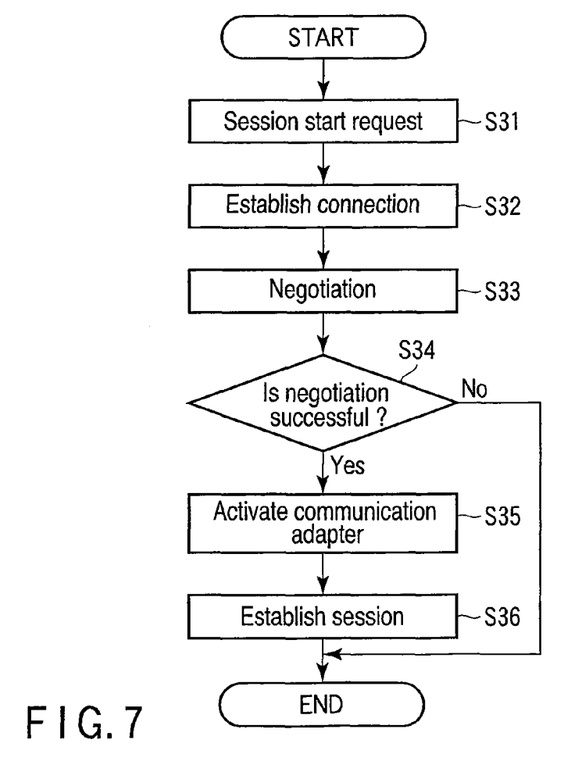
FIG. 7 is an exemplary flow chart illustrating an example of the procedure of a normal session start process which is executed by the electronic apparatus of the embodiment.

Next, referring to a flow chart of FIG. 7, a description is given of an example of the concrete procedure of a normal session establishing process.

When a new session start request from an application has been received via the application management module 201 (step S31), the session management module 204 executes, with use of the CNL layer, a process of establishing (physical) connection between the close proximity wireless transfer device 104 and an external device which are in a close proximity state (step S32). The external device is a device which is opposed to the close proximity wireless transfer device 104. Then, the session management module 204 executes a negotiation process with the external device, and sends to the external device the session information relating to the session to be established, for instance, information indicative of the communication adapter that is used, information indicative of the kind of data that is transmitted or received by the application, and information which identifies the application (step S33). If the negotiation is successfully carried out (YES in step S34), the session management module 204 activates the communication adapter corresponding to the protocol of the application which has transmitted the new session start request (step S35), and establishes the session which is used in order for the application to communicate with the application of the external device via the close proximity wireless transfer device 104 (step S36).

Figure 8:
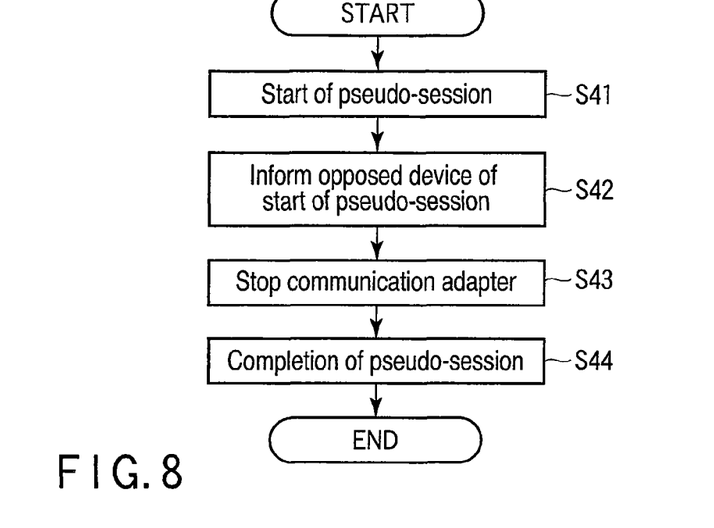
FIG. 8 is an exemplary flow chart illustrating an example of the procedure of a pseudo-session start process which is executed by the electronic apparatus of the embodiment.

Next, referring to a flow chart of FIG. 8, a description is given of the procedure of a pseudo-session establishing process for changing the state of a session to a pseudo-session state.

When there has occurred an event (pseudo-session start event) by which the state of a currently used session is to be changed to a pseudo-session state (step S41), the session management module 204 stores session information (including information indicative of the currently used communication adapter module) for identifying the currently used session, and sends the session information to the external device, thereby informing the external device of the start of a pseudo-session (step S42). In step S42, the session management module 204 issues to the external device a request for execution of a process of temporarily releasing the session which is currently in communication (a process of changing the state of the currently used session to the pseudo-session state). In step S42, the session information, which is sent to the external device from the session management module 204, may include, for instance, information indicative of the communication adapter which is to be stopped, information indicative of the kind of data, and information which identifies the application corresponding to the session.

Subsequently, the session management module 204 stops the communication adapter module which corresponds to the currently used session, without informing the communication program, which is currently in use, of the release of the currently used session, thereby temporarily releasing the currently used session (step S43). In the process of step S43, the session management module 204 controls the communication control module 202 so that the communication control module 202 is set in the standby state in which no data transmission is executed, even if transmission data is received from the communication program corresponding to the temporarily released session. In the external device, too, the same process as in step S43 is executed. Specifically, in the external device, too, a process is executed of stopping the communication adapter module which corresponds to the currently used session, without informing the communication program, which is currently in use, of the release of the currently used session, thereby temporarily releasing the currently used session.

By the above process, the process of changing the state of the established session to the pseudo-session state is completed (step S44).

A process of restoring the session, which is in the pseudo-session state, to the original state, can be executed, for example, at the time of the end of data transfer using the currently established normal session, that is, at the time of the end of the currently established normal session. In the meantime, it is possible to automatically start a process of restoring a session which is in a pseudo-session state to a normal session when a predetermined time period has passed since the session corresponding to a certain application was set in the pseudo-session state. Thereby, prior to the occurrence of overflow of the buffer or a time-out error of an application, a session corresponding to this application can automatically be restored to the original state. Besides, using as a trigger a timing when the number of times of reception of a data transmission/reception request, which is sent from an application while a session corresponding to this application is set in a pseudo-session state, has exceeded a predetermined value, or a timing when the free space of the buffer has decreased below a predetermined value, a process of restoring the session, which is in the pseudo-session state, to a normal session may automatically be started.

Figure 9:
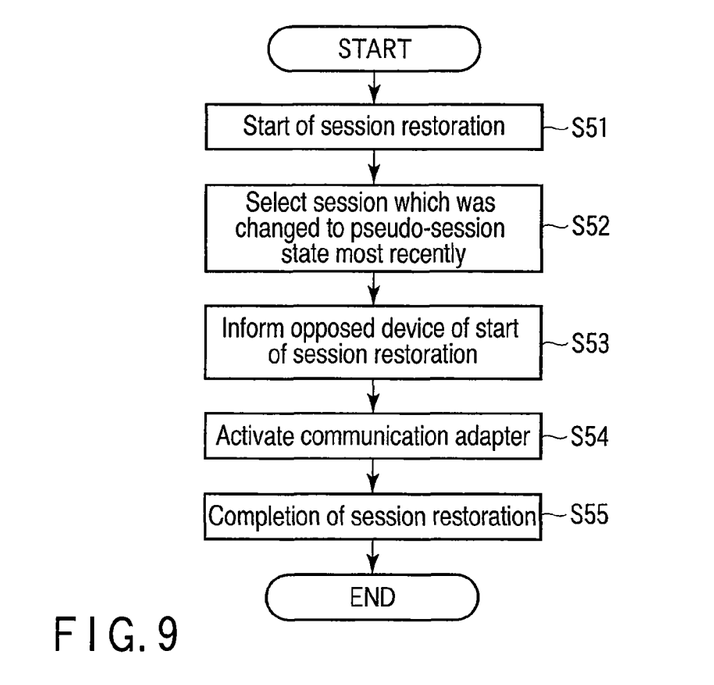
FIG. 9 is an exemplary flow chart illustrating an example of the procedure of a process of restoring a pseudo-session to a normal session, which is executed by the electronic apparatus of the embodiment.

Next, referring to a flow chart of FIG. 9, a concrete procedure of the session restoring process is described.

In the case where data transfer using a currently established session has been finished, for example, in the case where a session finishing request has been received from the communication program which is currently in communication, the session management module 204 starts restoring a session which is set in the pseudo-session state (step S51). To start with, the session management module 204 releases a currently established session. In the process of releasing the session, the session management module 204 releases the session by stopping the communication adapter module which is used in the session, and reports the release of the session to the communication program which has sent the session finishing request. Then, on the basis of the stored session information, the session management module 204 selects a to-be-restored session from among sessions which stand by for data transmission/reception, that is, sessions in the pseudo-session state (step S52). In step S52, the session management module 204 selects, as the to-be-restored session, a session which was set in the pseudo-session state most recently, that is, a session which is specified by the session information that was last stored. The session management module 204 sends the session information of the selected to-be-restored session to the external device, and issues a request for execution of the session restoring process to the external device (step S53). On the basis of the session information corresponding to the selected to-be-restored session, the session management module 204 restores the selected session to the data transferable state (step S54). In step S54, the session management module 204 activates the communication adapter module which was used in the to-be-restored session, and cooperates with the application management module 201 and communication control module 202 to release the execution of the process of storing in the buffer the transmission data from the application using the to-be-restored session, without sending the transmission data. The data, which has been stored in the buffer, is output to the activated communication adapter module. In addition, transmission data from the application using the restored session is sent to the activated communication adapter module.

In the external device, too, the same process as in step S54 is executed. Specifically, in the external device, a session which is specified by the session information is selected, and the selected session is restored to the original state (i.e., a state in which data transfer can be executed).

By the above process, the restoration of the session is completed (step S55).

Figure 10:
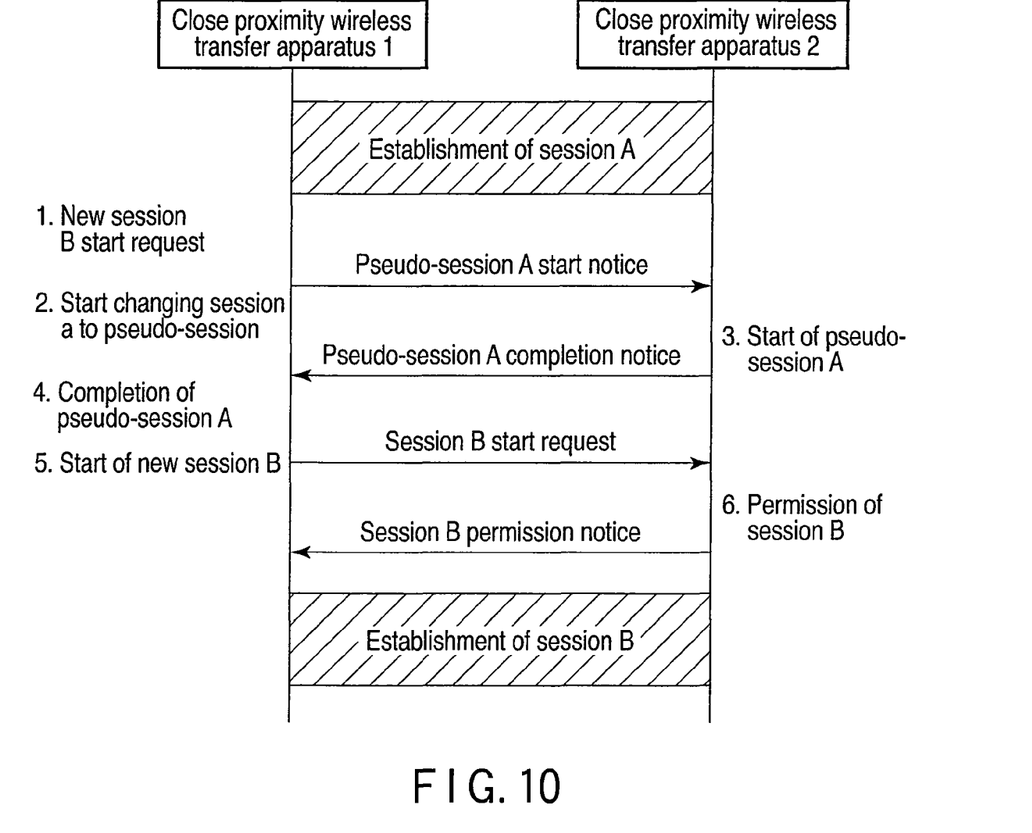
FIG. 10 is an exemplary flow chart illustrating an example of the sequence of a pseudo-session start process which is executed by the electronic apparatus of the embodiment.

FIG. 10 illustrates a pseudo-session start sequence which is executed between two devices which are in a close proximity state.

Each of close proximity wireless transfer apparatuses 1 and 2 shown in FIG. 10 is a device having the same function as the pseudo-session management function of the present embodiment. While a session A is established between the close proximity wireless transfer apparatus 1 (device 1) and close proximity wireless transfer apparatus 2 (device 2), if the PCL layer of the device 1 receives a new session start request (a new session B start request) from an application which is not currently in communication, a process is started of changing the state of the session A to a pseudo-session state.

To start with, the device 1 informs the device 2 of the pseudo-session start by the close proximity wireless transfer between the device 1 and device 2. Each of the device 1 and device 2 starts a process of changing the state of the established session A to the pseudo-session state. Each of the device 1 and device 2 stores the session information relating to the session A which has been changed to the pseudo-session state. If the device 1 receives a pseudo-session completion notice from the device 2, the process of changing the state of the session A to the pseudo-session state is completed.

Subsequently, the device 1 sends, as a new session B start request, session information relating to a new session B to the device 2, and issues a request for establishment of the new session B to the device 2. In the case where the device 2 can establish the new session B, the device 2 sends to the device 1 a session permission notice indicating that the establishment of the new session B is permitted. Thereafter, each of the devices 1 and 2 executes a process of establishing the new session B.

Figure 11:
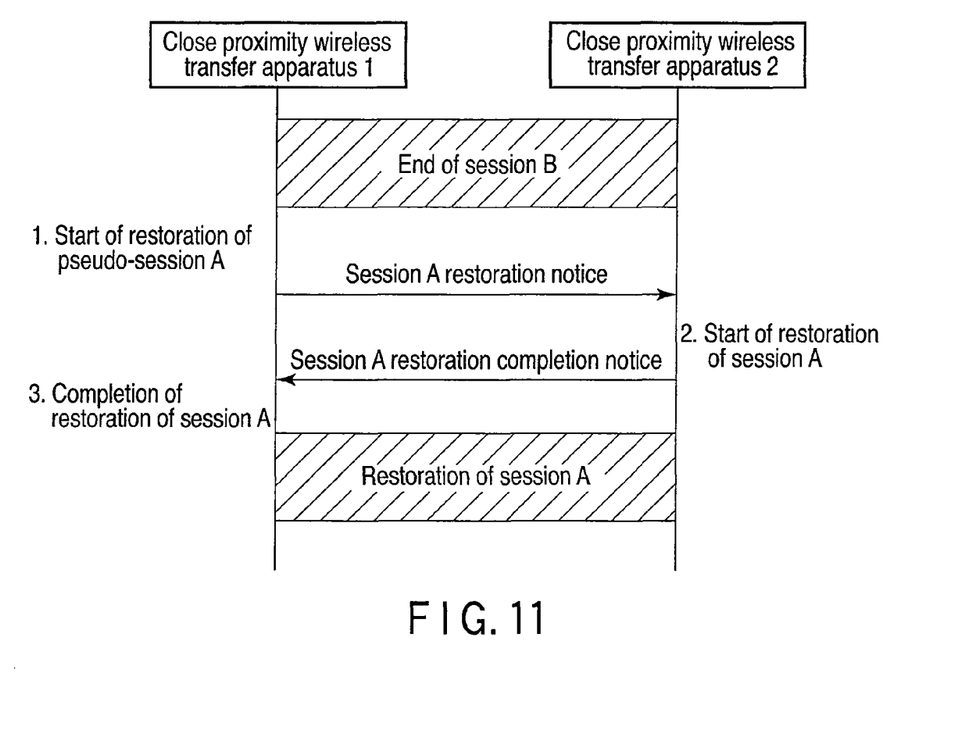
FIG. 11 shows an example of the sequence of a process of restoring a pseudo-session to a normal session, which is executed by the electronic apparatus of the embodiment.

FIG. 11 shows the sequence of a session restoring process which is executed between two devices which are in a close proximity state.

A description is given of a sequence which is executed after the session B is established in FIG. 10. If the session B, which is currently in communication, is finished, the device 1 informs the device 2 of the start of restoration of the session A by the close proximity wireless transfer between the device 1 and device 2. Each of the device 1 and device 2 starts, on the basis of the stored session information of the session A, a process of restoring the session A, which is set in the state (pseudo-session state) to wait for data transfer, to the normal session state in which data transfer can be executed. If the device 1 receives a session restoration completion notice from the device 2, the process of restoring the session A is completed.

As has been described above, in the present embodiment, if a session start request from a communication program B is received in the state in which a session A between a communication program A and an external device is established, the first communication adapter module which is used in the session A is stopped without informing the communication program A of release of the session A, thereby temporarily releasing the session A. As a result, the communication program A can be made to have such recognition that the session A is maintained, and the resource (communication adapter module), which is used by the communication program A, can be released. Therefore, the new session B can be established between the communication program B and the external device. In addition, for example, when the session B, which is currently in communication, is finished, the process of restoring the session A to the original state is automatically executed on the basis of the session information which was stored at the time of releasing the session A.

Therefore, the user can easily switch the application that is used for communication with the external device, without being aware of an operation relating to release/re-establishment of a session. While communication by a certain application is being executed, the use can easily execute communication using another application.

For example, during the time period in which an application corresponding to a storage class protocol such as SCSI is being used, it is possible to execute, without terminating the communication of this application, another application corresponding to a protocol such as OBEX for transmitting small data such as image data. The user, without being aware of the termination of communication of an application, can preferentially execute the communication of another application which is operated later.

In the meantime, the respective components in the PCL layer shown in FIG. 4 can also be realized as hardware modules.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a close proximity wireless transfer device to establish a connection between the close proximity wireless transfer device and an external device which is in a close proximity state with the close proximity wireless transfer device, and execute close proximity wireless transfer with the external device;
a communication adapter module comprising a plurality of conversion modules which converts a plurality of kinds of data corresponding to a plurality of application protocols to a predetermined transmission data format;
a session establishing module to establish a first session between a first communication program of an application layer of the apparatus and the external device via the close proximity wireless transfer device in response to a session start request which is transmitted from the first communication program of the application layer, by activating a first conversion module of the plurality of conversion modules, the first conversion module corresponding to an application protocol of the first communication program of the application layer;
a session control module to execute, when a session start request is received from a second communication program of the application layer in a state in which the first session is established, (i) a process of temporarily releasing the first session by stopping the first conversion module without informing the first communication program of the release of the first session, (ii) a process of storing session information indicative of the first conversion module, and (iii) a process of establishing a second session between the second communication program and the external device via the close proximity wireless transfer device by activating a second conversion module of the plurality of conversion modules, the second conversion module corresponding to an application protocol of the second communication program; and
a session restoring module to restore the first session to a data transferable state by activating the first conversion module based on the stored session information when the second session is finished,
wherein, when data which is transmitted by the first communication program is received after the first session is temporarily released, the session control module stores the received data in a buffer in the apparatus, and outputs the data which is stored in the buffer to the first conversion module when the first session is restored.

2. The electronic apparatus of claim 1, wherein the session control module executes, when a session start request is received from a third communication program of the application layer in a state in which the second session is established, (i) a process of temporarily releasing the second session by stopping the second conversion module without informing the second communication program of the release of the second session, (ii) a process of storing session information indicative of the second conversion module, and (iii) a process of establishing a third session between the third communication program and the external device via the close proximity wireless transfer device by activating a third conversion module of the plurality of conversion modules, the third conversion module corresponding to an application protocol of the third communication program; and the session restoring module restores the second session to a data transferable state by activating the second conversion module based on the stored session information indicative of the second conversion module when the third session is finished.

3. The electronic apparatus of claim 1, wherein the session control module reports, when the session start request is received from the second communication program in the state in which the first session is established, the session information indicative of the first conversion module to the external device, and issues to the external device a request for execution of the process of temporarily releasing the first session.

4. The electronic apparatus of claim 1, wherein the session restoring module reports the session information indicative of the first conversion module to the external device when the second session is finished, and to issue to the external device a request for execution of the process of restoring the first session.

5. A communication control method of controlling close proximity wireless transfer which is executed between a close proximity wireless transfer device provided in an electronic apparatus and an external device, the method comprising:

establishing a first session between a first communication program of an application layer of the apparatus and the external device via the close proximity wireless transfer device by activating a first conversion module which converts data corresponding to an application protocol of the first communication program of the application layer, to a predetermined transmission data format, in response to a session start request transmitted from the first communication program of the application layer;

executing, when a session start request is received from a second communication program of the application layer in a state in which the first session is established, (i) a process of temporarily releasing the first session by stopping the first conversion module without informing the first communication program of releasing of the first session, (ii) a process of storing session information indicative of the first conversion module, and (iii) a process of establishing a second session between the second communication program and the external device via the close proximity wireless transfer device by activating a second conversion module which converts data corresponding to an application protocol of the second communication program to the predetermined transmission data format;

restoring the first session to a data transferable state by activating the first conversion module based on the stored session information when the second session is finished;

when data which is transmitted from the first communication program is received after the first session is temporarily released, storing the received data in a buffer; and outputting the data which is stored in the buffer to the first conversion module when the first session is restored.

6. The communication control method of claim 5, further comprising:

executing, when a session start request is received from a third communication program of the application layer in a state in which the second session is established, a process of temporarily releasing the second session by stopping the second conversion module without informing the second communication program of release of the second session, a process of storing session information indicative of the second conversion module, and a process of establishing a third session between the third communication program and the external device via the close proximity wireless transfer device by activating a third conversion module which of the plurality of conversion modules, third conversion module corresponding to an application protocol of the third communication program; and restoring the second session to a data transferable state by activating the second conversion module based on the stored session information indicative of the second conversion module when the third session is finished.

* * * * *